United States Patent [19]
Nara et al.

[11] Patent Number: 6,076,412
[45] Date of Patent: Jun. 20, 2000

[54] STARTER FOR AN INTERNAL COMBUSTION ENGINE

[75] Inventors: Koji Nara, Maebashi; Michio Okada, Gunma; Masaaki Ohya, Isesaki; Yoshikazu Sato, Fukaya; Shinichi Nagashima, Ashikaga, all of Japan

[73] Assignee: MITSUBA Corporation, Kiryu, Japan

[21] Appl. No.: 09/078,104

[22] Filed: May 13, 1998

[30] Foreign Application Priority Data

May 14, 1997 [JP] Japan ..................................... 9-124141

[51] Int. Cl.[7] ...................................................... H02K 5/00
[52] U.S. Cl. ...................................... 74/6; 74/7 E; 310/89
[58] Field of Search ............................. 74/7 E, 7 R, 7 A; 310/83, 85, 89; 290/48

[56] References Cited

U.S. PATENT DOCUMENTS

| | | | |
|---|---|---|---|
| 4,154,117 | 5/1979 | Mazzorana | 74/7 R |
| 4,506,162 | 3/1985 | Bolenz et al. | 74/7 R |
| 4,525,632 | 6/1985 | Tanaka | 74/7 R |
| 4,573,364 | 3/1986 | Givan | 310/83 |
| 4,673,838 | 6/1987 | Takagi et al. | 310/89 |
| 4,800,766 | 1/1989 | Isozumi et al. | 74/7 A |
| 5,118,960 | 6/1992 | Sasamoto et al. | 290/48 |
| 5,307,702 | 5/1994 | Spellman et al. | 74/7 A |

FOREIGN PATENT DOCUMENTS

8-319926  12/1996  Japan .

*Primary Examiner*—David A. Bucci
*Assistant Examiner*—William C Joyce
*Attorney, Agent, or Firm*—Marshall & Melhorn

[57] ABSTRACT

In an engine starter comprising: a DC electric motor; an output shaft; a pinion unit; a reduction gear unit for transmitting an output of the electric motor to the pinion unit through the output shaft; a solenoid device for axially moving the pinion unit into mesh with a ring gear of the engine; a cover member for surrounding at least the pinion and the reduction gear unit, the cover member having an opening facing the electric motor; a substantially cylindrical member for surrounding the electric motor so as to serve as a yoke for the electric motor; a disk-shaped plate for covering an end of the electric motor facing away from the pinion unit; and an annular separator disposed between the reduction gear unit and the electric motor so as to separate them from each other, the disk-shaped plate is provided with at least one axial protrusions for engaging an inner surface of one end portion of the substantially cylindrical member so as to align the disk-shaped plate and the substantially cylindrical member with each other, and an annular separator is provided with at least one axial protrusions for engaging an inner surface of the other end portion of the substantially cylindrical member so as to align the annular separator and the substantially cylindrical member with each other, and the annular separator is fitted into the opening of the cover member. Thus, since the disk-shaped plate, the substantially cylindrical member (yoke), the annular separator and the cover member are all aligned with each other without using the outer surface of the yoke, the outer surface of the yoke is allowed to be formed with lower precision. This eliminates the need of an additional step of machining or otherwise finishing the outer surface of the yoke with high precision, to thereby simplify the manufacturing process and lower the manufacturing cost of the yoke.

3 Claims, 5 Drawing Sheets

STARTER FOR AN INTERNAL COMBUSTION ENGINE

TECHNICAL FIELD

The present invention relates to an engine starter, and in particular to an engine starter which a motor casing for covering an electric motor serves as a yoke for the electric motor.

BACKGROUND OF THE INVENTION

In conventional engine starters, it has been customary to arrange the output shaft, which carries an axially slidable pinion adapted to mesh with a ring gear, and the solenoid device for axially driving the pinion, in a mutually parallel relationship. In such a bi-axial engine starter, the solenoid device extends radially from the electric motor and therefore inevitably makes the radial dimension of the starter substantial, imposing severe restrictions in ensuring a sufficient space for mounting the engine starter. For this reason, various types of coaxial starters have been proposed in which an annular solenoid device is arranged so as to surround the output shaft (see for example Japanese Patent Application Laid-Open Publication No. 8-319926 filed by the same applicant).

In either type of engine starter, the electric motor is surrounded by a yoke which also serves as a cover. Typically, a reduction gear unit is disposed between the electric motor and the pinion, and between the electric motor and the reduction gear unit is interposed an annular separator, while the end of the electric motor facing away from the separator is covered by a bottom member. In the engine starter proposed by the applicant of this invention, a disk-shaped bottom plate which can be formed by means of press working is used as the bottom member in order to reduce the manufacturing cost thereof.

In such an engine starter, one end of the yoke is fitted on axial protrusions formed on the bottom plate in such a manner that the inner surface of the one end portion of the yoke engages the outer surfaces of the protrusions of the bottom plate, while the other end of the yoke is fitted into a cover member (gear cover) for surrounding the pinion and the reduction gear unit, with the outer surface of the other end portion of the yoke engaging the inner surface of the cover member so that the yoke is securely held, and thereby achieving the axial alignment of the cover member, the yoke and the bottom plate. In such an arrangement, therefore, both outer and inner surfaces of the yoke must be formed with high precision by press working or finished by machining with high precision after the press working. This may complicate the manufacturing process and therefore lead to a higher manufacturing cost.

BRIEF SUMMARY OF THE INVENTION

In view of such problems of the prior art, a primary object of the present invention is to provide an engine starter which can allow an outer surface of a yoke for an electric motor to be formed with lower precision to thereby simplify the manufacturing process and lower the cost of the engine starter.

A second object of the present invention is to provide such an engine starter with a minimum modification from the conventional configuration.

According to the present invention, these and other objects can be accomplished by providing a starter for an internal combustion engine, comprising: a DC electric motor; an output shaft; a pinion unit connected to the output shaft via a spline; a reduction gear unit disposed between the pinion unit and the electric motor so as to transmit an output of the electric motor to the pinion unit through the output shaft; a solenoid device for axially moving the pinion unit into mesh with a ring gear of the engine; a cover member for surrounding at least the pinion and the reduction gear unit, the cover member having an opening facing the electric motor; a substantially cylindrical member for surrounding the electric motor so as to serve as a yoke for the electric motor; a disk-shaped plate for covering an end of the electric motor facing away from the pinion unit, the disk-shaped plate provided with at least one axial protrusions for engaging an inner surface of one end portion of the substantially cylindrical member so as to align the disk-shaped plate and the substantially cylindrical member with each other; and an annular separator disposed between the reduction gear unit and the electric motor so as to separate the reduction gear unit and the electric motor from each other, the annular separator provided with at least one axial protrusions for engaging an inner surface of the other end portion of the substantially cylindrical member so as to align the annular separator and the substantially cylindrical member with each other, and the annular separator fitted into the opening of the cover member.

Thus, the disk-shaped plate, the substantially cylindrical member (yoke), the annular separator and the cover member are axially aligned with each other without using the outer surface of the yoke, and therefore, the outer surface of the yoke is allowed to be formed with lower precision. This eliminates the need of an additional step of machining or otherwise finishing the outer surface of the yoke with high precision, to thereby simplify the manufacturing process and lower the manufacturing cost of the yoke.

In view of simplifying the manufacturing process and lowering the manufacturing cost, the at least one axial protrusions of the disk-shaped plate as well as of the annular separator are preferably formed in a press working process for punching out the disk-shaped plate and the annular separator from a metallic plate. In the case where the separator is made of an electrically conductive material such as a metal, a lead connected to a negative pole brush of the DC electric motor can be attached to one of the at least one axial protrusions of the separator by spot-welding for example, and from there connected to the negative terminal of the battery through the vehicle body. The spot-welding may cause a mar on the backside (or the side facing the reduction gear unit) of the one of the protrusions of the separator. However, since the axial protrusions are formed by press working and therefore a recess is formed on the backside of each axial protrusion, the mar caused on the backside of the protrusion by the spot-welding will not affect the arrangement of the annular separator.

Typically the starter for an internal combustion engine according to the present invention further comprises a brush holder stay formed of a resin material for holding brushes of the DC electric motor, and the brush holder stay is interposed between the separator and the substantially cylindrical member. In such a case, the brush holder stay is preferably formed with a tongue extending in a radially outward direction from an outer periphery thereof so that the tongue is pressed between the separator and an end of the substantially cylindrical member in an assembled state of the starter, to thereby prevent the warp of the brush holder stay. The at least one axial protrusions of the annular separator preferably consist of plurality of axial protrusions which are circumferentially spaced from each other so that the axial protrusions do not interfere with the tongue of the brush holder stay.

BRIEF DESCRIPTION OF THE DRAWINGS

Now the present invention is described in the following with reference the appended drawings, in which.

DETAILED DESCRIPTION OF THE PREFERRED EMBODIMENTS

Figure 1:
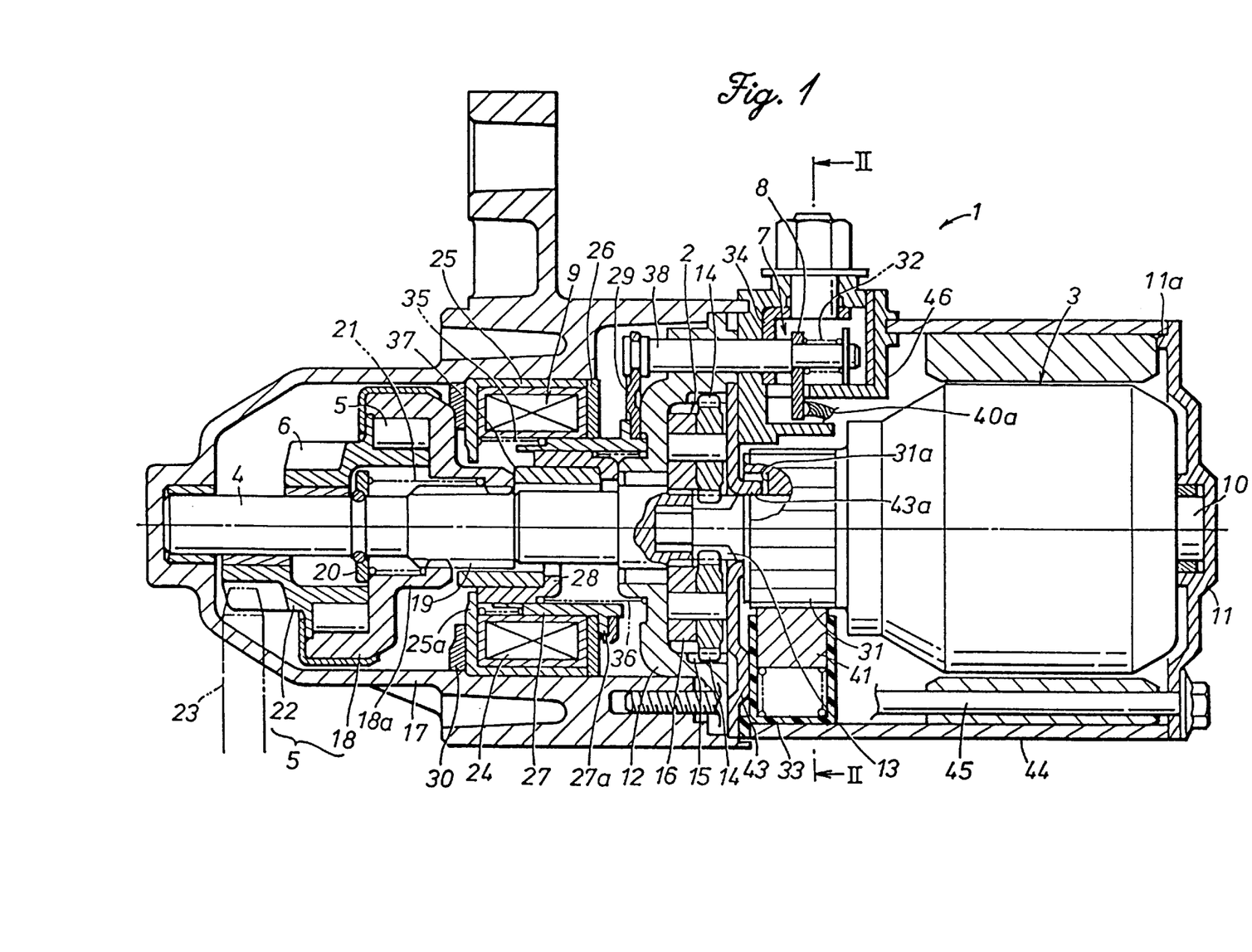
FIG. 1 is an overall cross sectional view of an engine starter configured according to the present invention.

FIG. 1 generally illustrates an engine starter equipped with a reduction gear unit which is constructed according to the present invention, and the upper half of the drawing illustrates the starter at its inoperative state while the lower half of the drawing illustrates the starter at its operative state. It should be noted that in FIG. 1 the component parts are shown in their respective cross sections selected in view of clearer explanation, and therefore these cross sections are not necessarily in the same plane. This starter 1 produces a torque which is necessary for starting an internal combustion engine, and comprises an electric motor 3 equipped with a planetary gear reduction gear unit 2, an output shaft 4 connected to the electric motor 3 via the reduction gear unit 2, a one-way roller clutch 5 and a pinion 6 which are slidably mounted on the output shaft 4, a switch unit 7 for selectively opening and closing the electric power line leading to the electric motor 3, and a solenoid device 9 for axially moving the pinion 6.

The electric motor 3 consists of a known commutator type DC electric motor, and its rotor shaft 10 is pivotally supported at a center of a bottom plate 11 at its right end, and pivotally supported at a center of a right end of the output shaft 4, which is coaxially disposed with respect to the rotor shaft 10, at its left end.

The reduction gear unit 2 is provided on the inner surface of the top plate 12 of the electric motor 3. The reduction gear unit 2 comprises a sun gear 13 which is formed in a part of the rotor shaft 10 adjacent to the output shaft 4, a plurality of planetary gears 14 meshing with the sun gear 13, and an internal teeth ring gear 15 formed along the inner periphery of the top plate 12 to mesh with the planetary gears 14. A support plate 16 supporting the planetary gears 14 is attached to the right end of the output shaft 4 which is pivotally supported at the center of the top plate 12.

To the top plate 12 is attached a gear cover (or cover member) 17 which also serves as a securing bracket for mounting the starter to the engine. The left end of the output shaft 4 is pivotally supported by a central part of the inner surface of the left wall of the gear cover 17.

The outer circumferential surface of a middle part of the output shaft 4 engages the inner circumferential surface of a clutch outer member 18 of the one-way roller clutch 5 via a helical spline 19. The clutch outer member 18 is normally urged to the right by a return spring 21 interposed between a connecting portion 18a of the helical spline 19 to the output shaft 4 and a stopper plate 20 secured to a left end portion of the output shaft 4. The return spring 21 is received in an annular gap defined between the inner circumferential surface of a sleeve 18b formed on the inner circumferential surface of the clutch outer member 18 and the outer circumferential surface of the output shaft 4.

The clutch outer member 18 engages a clutch inner member 22 of the one-way roller clutch 5 in an axially fast but rotationally free relationship. The outer circumferential surface of the left end of the clutch inner member 22 is integrally formed with the aforementioned pinion 6 which meshes with the ring gear 23 of the engine to drive the same. The clutch inner member 22 integrally formed with the pinion 6 is fitted on the left end of the output shaft 4 in a both rotationally and axially free relationship.

In an intermediate part of the gear cover 17 is secured an energization coil 24 which surrounds the output shaft 4 made of non-magnetic material. The energization coil 24 is surrounded by a yoke which consists of an annular disk 26 and a cup-shaped holder 25 having an internal flange 25a surrounding the output shaft 4. In a gap defined between the inner circumferential surface of the energization coil 24 and the outer circumferential surface of the output shaft 4 is disposed an armature outer member 27 and an armature inner member 28, both made of ferromagnetic material, in a mutually coaxial and axially slidable manner. The left ends of the armature members 27 and 28 oppose the inner surface of a central part of the internal flange 25a of the holder 25, and the central part of the internal flange 25a serves as a pole for the armature members 27 and 28.

An annular connecting plate 29 is fitted around the outer periphery of the right end of the armature outer member 27, and a connecting rod 38 which projects axially from an outer peripheral part of the connecting plate 29 is passed through the top plate 12 of the electric motor 3. To the projecting end of the connecting rod 38 is attached a moveable contact plate 8 of the switch unit 7 provided near a commutator 31 of the electric motor 3. The moveable contact plate 8 is mounted on the connecting rod 38 in an axially moveable manner, and is floatingly supported by a coil spring 32.

Figure 5:
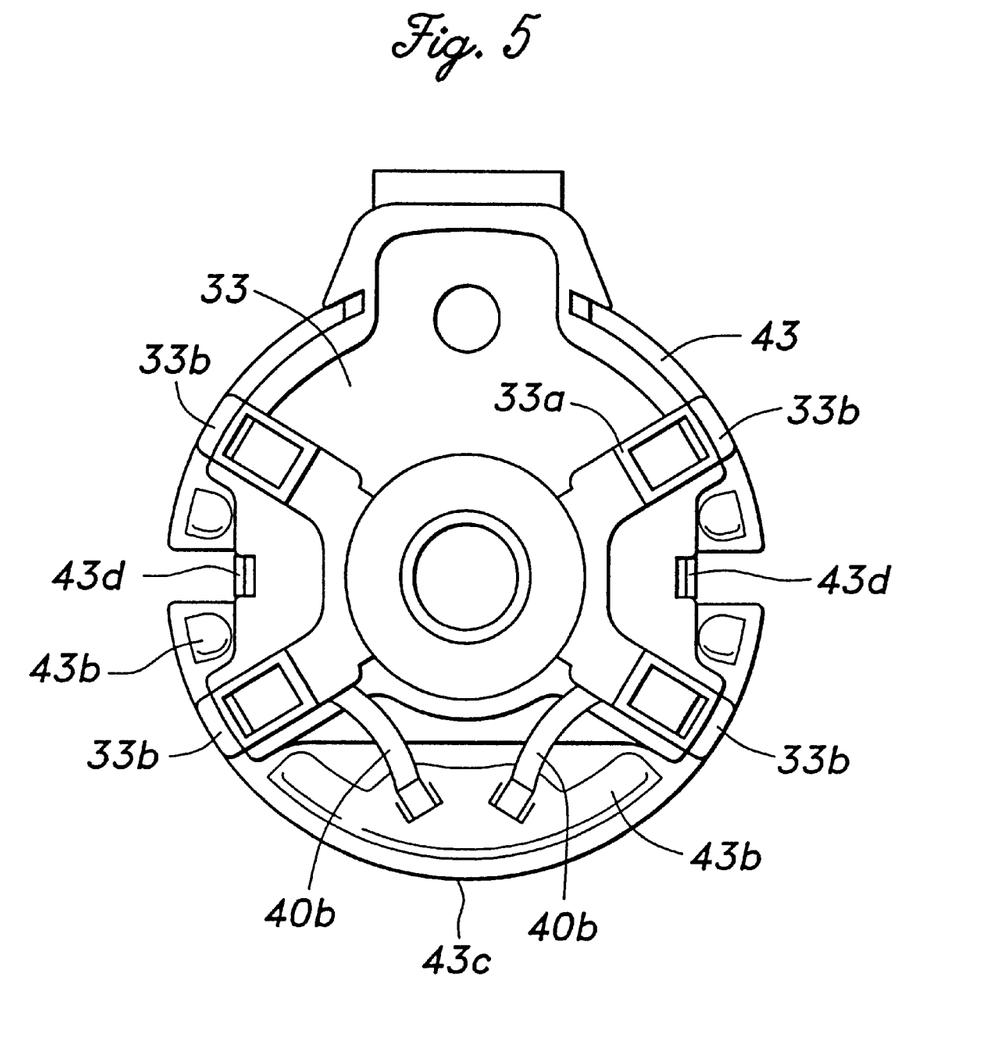
FIG. 5 is a frontal view showing a brush holder stay attached to the separator.

In this embodiment, four brush holders 33a are disposed around the commutator 31 (best seen in FIG. 5). These brush holders 33a are integrally formed in a brush holder stay 33 which is made of synthetic resin material and securely mounted between the motor casing (or yoke) 44 and the gear cover 17 as described more in detail later. A fixed contact plate 34 of the switch unit 7 is secured to the brush holder stay 33, and the aforementioned moveable contact plate 8 is provided such that it can be engaged and disengaged with and from the fixed contact plate 34.

Figure 2:
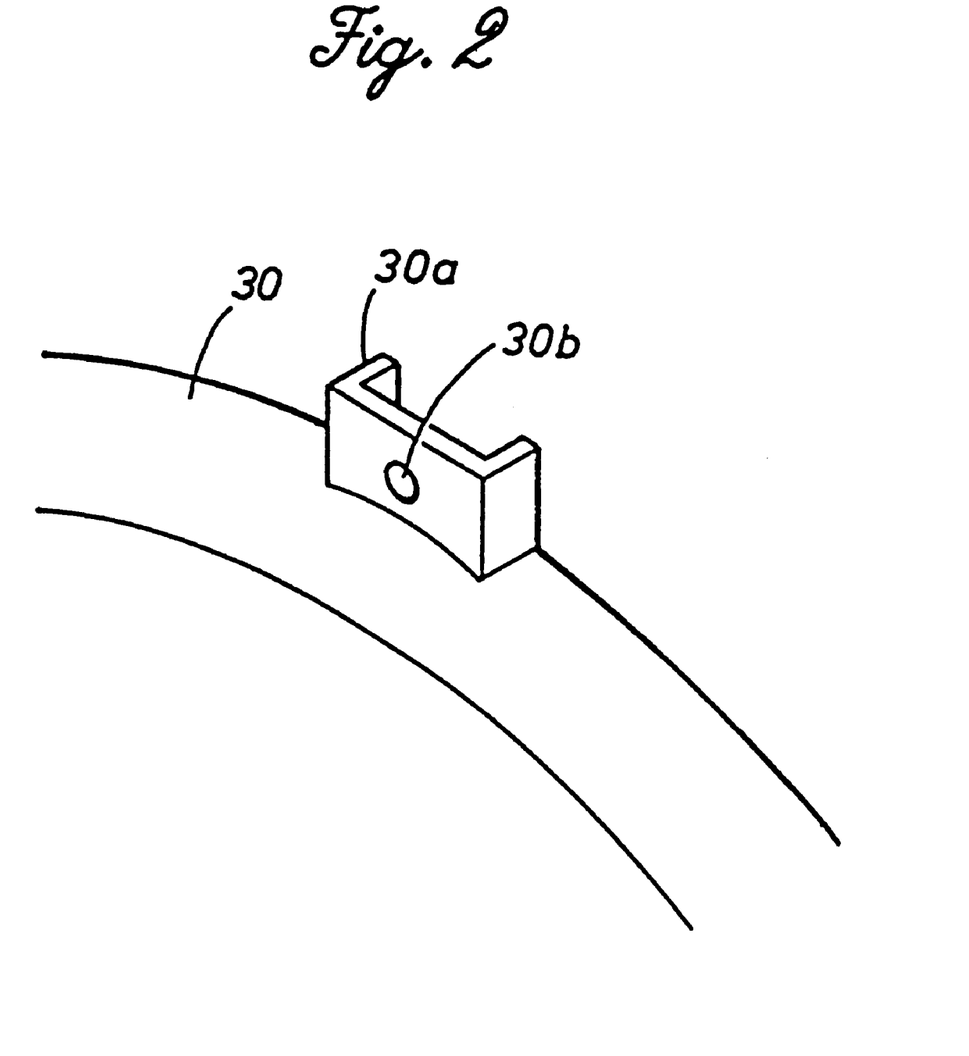
FIG. 2 is an enlarged schematic perspective view of a part of a stopper FIG. 1.

To prevent the right end surface of a pinion unit, which comprises the one-way roller clutch 5 and the pinion 6, from abutting the left end surface of the holder 25 when the pinion unit moves in the axial direction, an annular stopper 30 which can be made of resin material is interposed therebetween. As shown in FIG. 2, the stopper 30 is provided on its outer peripheral surface with a plurality of tongues 30a projecting radially outwardly. On the surface of each tongue 30a which faces the clutch outer member 18 is formed a projection 30b. Each tongue 30a is hollowed on its side opposite to that on which the projection 30b is formed, so that each tongue 30a has a "[" shape when viewed in the radial direction. This provides the tongue 30a with axial resiliency. The gear cover 17 is formed on its inner peripheral surface with a plurality of recesses 17a which are aligned with the tongues 30a to receive the same.

The armature outer member 27 is always urged to the right by a return spring 35 interposed between the armature outer member 27 and the internal flange 25a of the holder 25 for the energization coil 24, and is normally at its neutral position separating the moveable and fixed contact plates of the switch unit 7 from each other.

The armature inner member 28 is always urged to the left with respect to the top plate 12 by a coil spring 36 which is weaker than the return spring 21 of the clutch outer member 18. The armature inner member 28 is connected to a shifter member 37 made of non-magnetic material having a left end engaging the right end of the clutch outer member 18. The energization coil 24 is electrically connected to an ignition switch not shown in the drawing via a connector provided in the switch unit 7. The fixed contact plate 34 of the switch unit 7 is electrically connected to the positive terminal of a battery not shown in the drawings via a power terminal, and a pair of pigtails (or leads) 40a connected to a pair of positive pole brushes are attached to the movable contact plate 8 of the switch unit 7. A pair of negative pole brushes 41 are provided in a line-symmetrically opposing positions with respect to the positive pole brushes. The pigtails 40b for these negative pole brushes 41 are connected to a metallic annular separator (or a center plate) 43 which is described hereinafter, and are connected to the negative terminal of the battery via the gear cover 17 and the vehicle body which is not shown in the drawings. The switch unit 7 is provided in a space flanked by the positive pole brushes.

The metallic annular separator 43 is interposed between the top plate 12 and the commutator 31 to separate the reduction gear unit 2 from the electric motor 3. A central part of the separator 43 is provided with a cylindrical portion 43a which projects toward the commutator 31 with its inner circumferential surface receiving the outer circumferential surface of the rotor shaft 10 defining a small gap therebetween. The free end of the cylindrical portion 43a is received in a recess 31a formed in an axial end surface of the commutator 31 to prevent grease from leaking out of the reduction gear unit 2 to the commutator 31.

Figure 3:
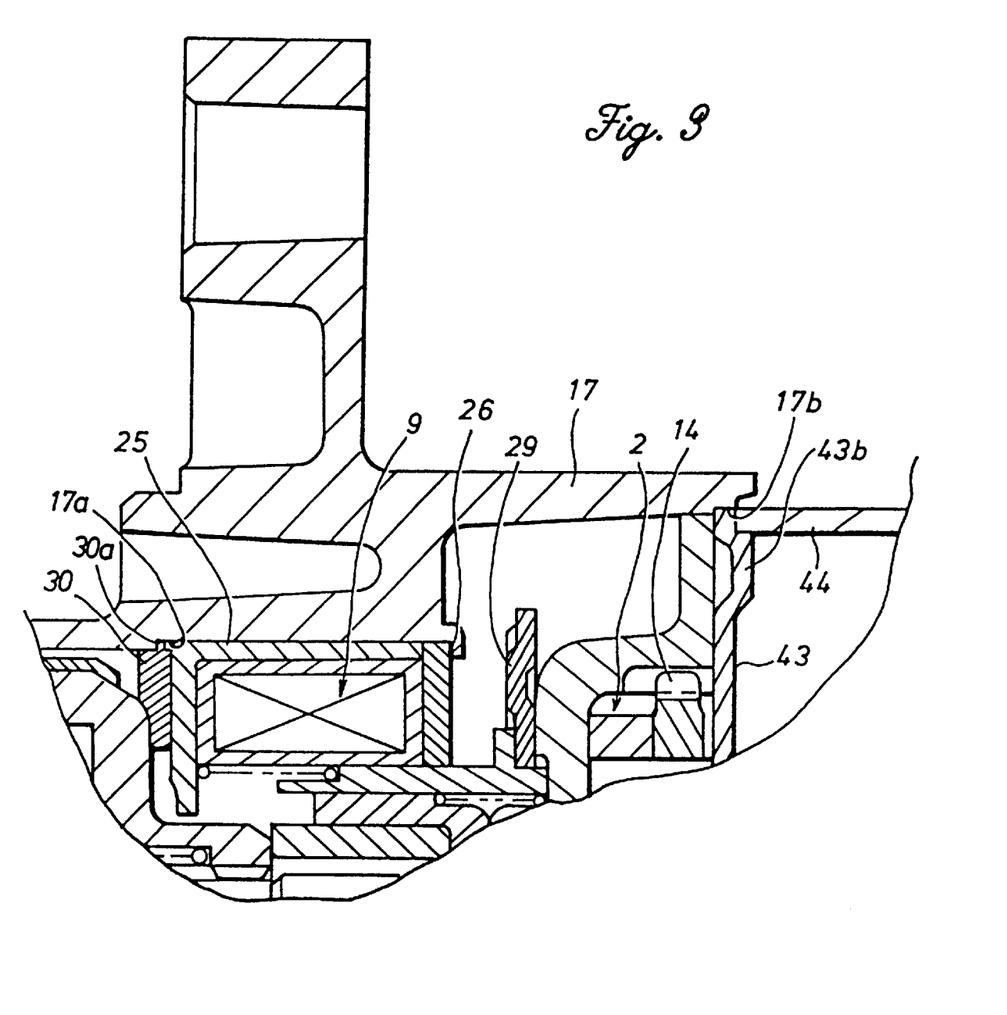
FIG. 3 is an enlarged sectional view for showing an engagement between the separator and the yoke.

As shown in FIG. 1, the end plate 11 is connected to the gear cover 17 by means of through-bolts 45 which extend through the yoke 44 and the separator 43. Although FIG. 1 shows only one through-bolt 45 extending axially at a lower portion of the engine starter 1, this is for explanation only, and actually two through-bolts 45 extends at both lateral side portions of the engine starter 1. The right end of the yoke 44 is fitted on axial protrusions 11a formed on the bottom plate 11, with the inner surface of the right end portion of the yoke 44 engaging the outer surfaces of the axial protrusions 11a. As shown in FIG. 3, which shows a different sectional view from FIG. 1, the left end of the yoke 44 is fitted on axial protrusions 43b (FIG. 4) formed on the separator 43, with the inner surface of the left end portion of the yoke 44 engaging the outer surfaces of the axial protrusions 43b. The separator 43 in turn is fitted in an opening of the gear cover 17 and received by an inner stepped portion 17b formed around the opening, with an outer surface 43c of the separator 43 engaging the inner surface of the gear cover 17. Thus, the separator 43, the yoke 44 and the bottom plate 11 are axially aligned by fitting the yoke 44 on the axial protrusions formed on the separator 43 and the bottom plate 11, while the gear cover 17 and the separator 43 are axially aligned by fitting the separator 43 into the opening of the gear cover 17. Therefore, the yoke 44 is not fitted into the gear cover 17 and hence the outer surface of the yoke 44 is only exposed to outside and not used in the alignment, eliminating the need to form the outer surface of the yoke 44 with high precision and thus facilitating the manufacture of the yoke 44.

Figure 4:
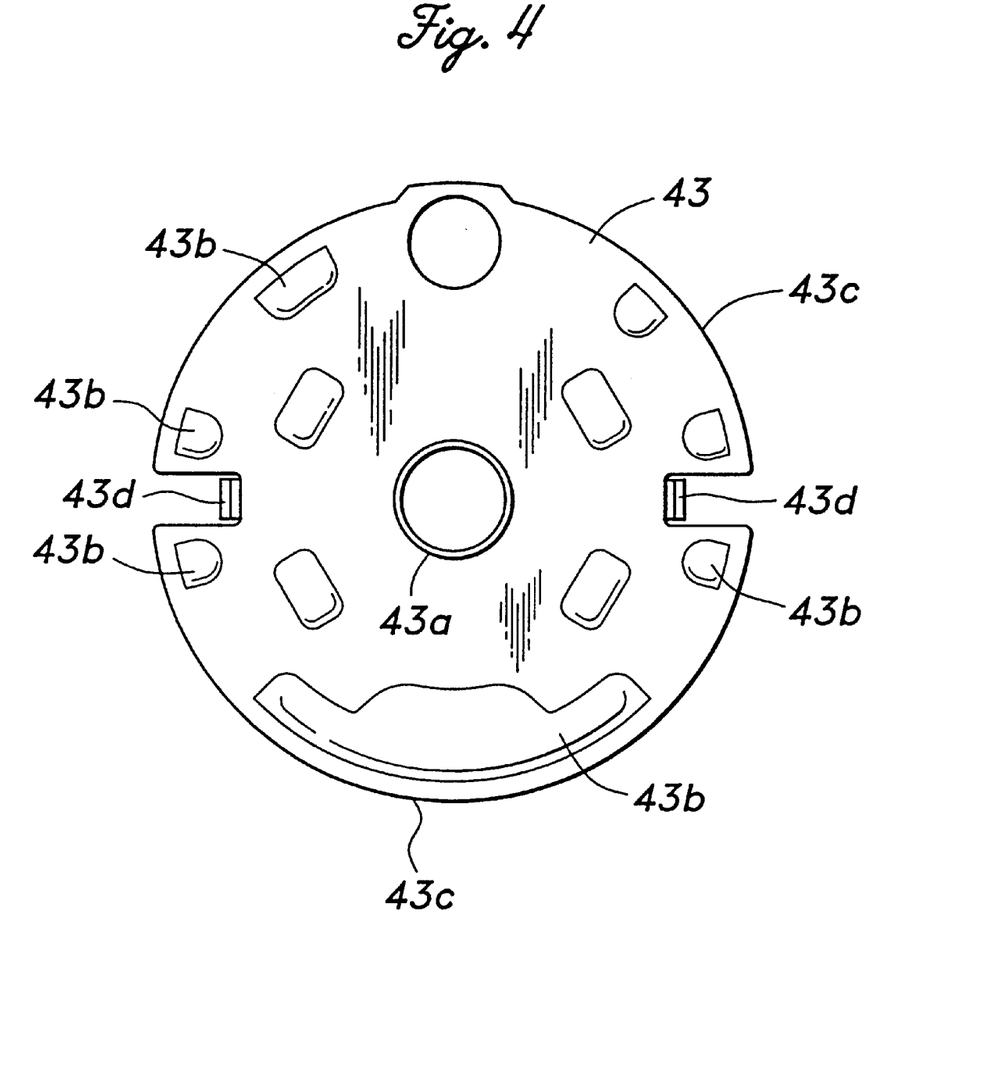
FIG. 4 is a frontal view of the separator shown in FIG. 1.

The axial protrusions 11a of the bottom plate 11 and the axial protrusions 43b of the separator 43 can be formed in the press working process for punching out the bottom plate 11 and the separator 43 from a metallic plate. This can allow the axial protrusions 11a and 43b as well as the outer surface 43c of the separator 43 which are used in the alignment to be formed with sufficient precision and with low cost, although the axial protrusions can be provided in other ways such as by bonding separate parts to the bottom plate 11 and the separator 43 or by machining them.

FIG. 4 is a frontal view of the annular separator 43. As shown in the drawing, the separator 43 has two radially receding portions on its lateral sides through which the through-bolts 45 extend in an axial direction. FIG. 5 is a frontal view showing the brush holder stay 33 attached to the annular separator 43. The brush holder stay 33 is fixed to the annular separator 43 by means of gripping fingers 43d provided at the receding portions of the separator 43. From an outer periphery of each of the four brush holders 33a extends a tongue 33b in a radially outward direction. In the assembled state, as seen in FIG. 1, these tongues 33b are pressed between the corresponding receding portions of the end of the yoke 44 and the separator 43 so as to prevent the warp of the brush holder stay 33 which is made of resin material. The axial protrusions 43b of the separator 43 are circumferentially spaced from each other so that they do not interfere with the tongues 33b of the brush holder stay 33. Thus, the provision of the axial protrusions 43b do not adversely affect the attachment of the brush holder stay 33. The pair of negative pole pigtails 40b are connected to the lowermost axial protrusion 43b by spot-welding. The spot-welding may cause a mar on the backside (or the side facing the reduction gear unit 2) of the protrusion 43b. However, since each of the axial protrusions 43b including the lowermost one is formed by press working and therefore a recess is formed on the backside thereof, the mar caused on the backside by the spot-welding will not affect the arrangement of the annular separator 43.

Now the operation of the above shown engine starter is described in the following. In the inoperative condition, because no electric current is supplied to the energization coil 24, the armature outer member 27 is at its rightmost condition under the spring force of the return spring 35. At the same time, the clutch outer member 18 which is urged by the return spring 21 is at its rightmost position along with the clutch inner member 22 which is integral with the pinion 6, the shifter member 37 and the armature inner member 28 with the result that the pinion 6 is disengaged from the ring gear 23.

When the ignition switch is turned to the engine start position, electric current is supplied to the energization coil 24 to magnetize the same. Once the energization coil 24 is magnetized, a magnetic path for conducting a magnetic flux is established in the armature inner and outer members 27 and 28 thereby moving the armature inner and outer members 27 and 28 to the left. The armature outer member 27, as it is closer to the central part (pole) of the internal flange 25a of the holder 25 than the armature inner member 28, moves before the armature inner member 28. As a result, although not shown in the drawings, the moveable contact plate 8 which is attached to the armature outer member 27 and to which pig tails 40a of the brushes of the electric motor 3 are connected moves to come into contact with the fixed contact plate 34 connected to the battery. This in turn causes the electric power of the battery to be supplied to the electric motor 3, and the rotor shaft 10 to be turned.

The armature outer member 27 comes to a stop with a certain gap defined between the left end surface of the armature outer member 27 and the central part of the internal flange 25a as an external flange 27a integrally formed at the right end of the armature outer member 27 comes into contact with the annular disk 26.

As the rotor shaft 10 turns, this rotation is reduced in speed by the reduction gear unit 2, and is transmitted to the output shaft 4. Because of the inertia of the clutch outer member 18 which engages with the output shaft 4 via the helical spline 19, the axial force owing to the helical spline 19 is applied to the clutch outer member 18, causing it to move to the left. At the same time, the armature inner member 28, which is subjected to the leftward attractive force by the energization coil 24 and the pressure from the coil spring 36, starts moving to the left. This force is applied to the clutch outer member 18 as an axial force via the shifter member 37.

This axial force pushes the clutch outer member 18 leftward against the biasing force of the return spring 21, and the pinion 6, which is integral with the clutch inner member 22 and is therefore integrally engaged with the clutch outer member 18, is also pushed leftward. Once the clutch outer member 18 engages with the stopper plate 20, and the pinion 6 comes into full mesh with the ring gear 23, the rotation of the output shaft 4 is transmitted to the ring gear 23, and starts the engine. At this point, the left end surface of the armature inner member 28 engages the central part of the internal flange 25a of the holder 25, and a small gap is defined between the left end surface of the shifter member 37 which has integrally moved with the armature inner member 28 and the clutch outer member 18. Because the armature inner member 28 receives a maximum attractive force of the energization coil 24 as it engages the central part of the internal flange 25a of the holder 25, even when the pinion 6 is subjected to a force which tends to disengage it from the ring gear 23, the rightward movement of the clutch outer member 18 is prevented by the shifter member 37, and the pinion 6 is prevented from dislodging from the ring gear 23.

The electric current that is required to keep the armature inner and outer members 27 and 28 stationary after they have moved the full stroke is substantially smaller than that required for starting the movement of the armature inner and outer members 27 and 28. In other words, by making use of the axial force owing to the helical spline 19 for starting the movement of the one-way roller clutch 5 including the pinion 6, the output requirement of the energization coil 24 can be reduced, and the size of the energization coil 24 can be accordingly reduced. Once the engine has started and the rotational speed of the engine exceeds that of the pinion 6, the pinion 6 will start turning freely by virtue of the one-way roller clutch in the same manner as in the conventional engine starter.

When the supply of electric current to the energization coil 24 ceases, owing to the biasing force of the return spring 21 acting upon the clutch outer member 18 and the biasing force of the return spring 35 acting upon the armature outer member 27, the pinion 6 is disengaged from the ring gear 23, and the electric motor 3 is stopped.

Thus, in the engine starter according to the present invention, the outer surface of the yoke is not used in axially aligning the gear cover, the separator, the yoke and the bottom plate, and hence is not required to be formed with high precision as the inner surface thereof. This can lead to an easier and simpler manufacturing process, and thus to a lower manufacturing cost of the engine starter. The axial protrusions formed on the separator and the bottom plate on which the yoke is fitted can be formed with sufficient precision in the press working process for punching out the separator and the bottom plate from a metallic plate, thereby preventing an increase in the manufacturing cost of these component parts. The protrusions on the separator are circumferentially spaced from each other so that they do not hinder the arrangement of the other component parts of the engine starter.

Although the present invention has been described in terms of preferred embodiments thereof, it is obvious to a person skilled in the art that various alterations and modifications are possible without departing from the scope of the present invention which is set forth in the appended claims.

What we claim is:

1. A starter for an internal combustion engine, comprising:
   a DC electric motor;
   an output shaft;
   a pinion unit connected to the output shaft via a spline;
   a reduction gear unit disposed between the pinion unit and the electric motor so as to transmit an output of the electric motor to the pinion unit through the output shaft;
   a solenoid device for axially moving the pinion unit into mesh with a ring gear of the engine, the solenoid device disposed between the pinion unit and the reduction gear unit;
   a cover member for surrounding at least the pinion unit, reduction gear unit and the solenoid device, the cover member having an opening facing the electric motor;
   a substantially cylindrical member for surrounding the electric motor so as to serve as a yoke for the electric motor;
   a disk-shaped plate for covering an end of the electric motor facing away from the pinion unit, the disk-shaped plate provided with at least one axial protrusions for engaging an inner surface of one end portion of the substantially cylindrical member so as to align the disk-shaped plate and the substantially cylindrical member with each other;
   an annular separator disposed between the reduction gear unit and the electric motor so as to separate the reduction gear unit and the electric motor from each other, the annular separator provided with at least one axial protrusions for engaging an inner surface of the other end portion of the substantially cylindrical member so as to align the annular separator and the substantially cylindrical member with each other, and the annular separator fitted into the opening of the cover member; and
   a brush holder stay formed of a resin material for holding brushes of the DC electric motor, the brush holder stay interposed between the separator and the substantially cylindrical member and formed with a tongue extending in a radially outward direction from an outer periphery thereof so that the tongue is pressed between the separator and an end of the substantially cylindrical member in an assembled state of the starter.

2. A starter for an internal combustion engine, comprising:
   a DC electric motor;
   an output shaft;
   a pinion unit connected to the output shaft via a spline;
   a reduction gear unit disposed between the pinion unit and the electric motor so as to transmit an output of the electric motor to the pinion unit through the output shaft;

a solenoid device for axially moving the pinion unit into mesh with a ring gear of the engine;

a cover member for surrounding at least the pinion unit and the reduction gear unit, the cover member having an opening facing the electric motor;

a substantially cylindrical member for surrounding the electric motor so as to serve as a yoke for the electric motor;

a disk-shaped plate for covering an end of the electric motor facing away from the pinion unit, the disk-shaped plate provided with at least one axial protrusions for engaging an inner surface of one end portion of the substantially cylindrical member so as to align the disk-shaped plate and the substantially cylindrical member with each other; and an annular separator disposed between the reduction gear unit and the electric motor so as to separate the reduction gear unit and the electric motor from each other, the annular separator provided with at least one axial protrusions for engaging an inner surface of the other end portion of the substantially cylindrical member so as to align the annular separator and the substantially cylindrical member with each other, and the annular separator fitted into the opening of the cover member, wherein the annular separator and its at least one axial protrusions are formed by means of press working, and wherein the separator is made of an electrically conductive material, and a lead connected to a negative pole brush of the DC electric motor is attached to one of the at least one axial protrusions of the separator.

3. A starter for an internal combustion engine, comprising:

a DC electric motor;

an output shaft;

a pinion unit connected to the output shaft via a spline;

a reduction gear unit disposed between the pinion unit and the electric motor so as to transmit an output of the electric motor to the pinion unit through the output shaft;

a solenoid device for axially moving the pinion unit into mesh with a ring gear of the engine;

a cover member for surrounding at least the pinion unit and the reduction gear unit, the cover member having an opening facing the electric motor;

a substantially cylindrical member for surrounding the electric motor so as to serve as a yoke for the electric motor;

a disk-shaped plate for covering an end of the electric motor facing away from the pinion unit, the disk-shaped plate provided with at least one axial protrusions for engaging an inner surface of one end portion of the substantially cylindrical member so as to align the disk-shaped plate and the substantially cylindrical member with each other; and an annular separator disposed between the reduction gear unit and the electric motor so as to separate the reduction gear unit and the electric motor from each other, the annular separator provided with at least one axial protrusions for engaging an inner surface of the other end portion of the substantially cylindrical member so as to align the annular separator and the substantially cylindrical member with each other, and the annular separator fitted into the opening of the cover member, wherein the starter further comprises a brush holder stay formed of a resin material for holding brushes of the DC electric motor, the brush holder stay interposed between the separator and the substantially cylindrical member and formed with a tongue extending in a radially outward direction from an outer periphery thereof so that the tongue is pressed between the separator and an end of the substantially cylindrical member in an assembled state of the starter, and wherein the at least one axial protrusions of the annular separator comprise a plurality of axial protrusions which are circumferentially spaced from each other so that the axial protrusions do not interfere with the tongue of the brush holder stay.

* * * * *